United States Patent [19]

Faulds

[11] Patent Number: 5,784,372
[45] Date of Patent: Jul. 21, 1998

[54] SCHEDULING CONNECTIONS ACROSS A SWITCHING MATRIX

[75] Inventor: Gordon John Faulds, Reading, United Kingdom

[73] Assignee: Northern Telecom Limited, Montreal, Canada

[21] Appl. No.: 634,424

[22] Filed: Apr. 18, 1996

[30] Foreign Application Priority Data

Apr. 18, 1995 [GB] United Kingdom .................. 9507871

[51] Int. Cl.$^6$ ........................................... H04L 12/56
[52] U.S. Cl. .................... 370/398; 370/412; 359/139
[58] Field of Search ........................... 370/360, 390, 370/395, 398, 399, 412, 413, 414, 415, 416, 422, 427; 359/117, 128, 139

[56] References Cited

U.S. PATENT DOCUMENTS

| 5,091,905 | 2/1992 | Amada | 370/415 |
|---|---|---|---|
| 5,124,978 | 6/1992 | Chao | 370/60 |
| 5,126,999 | 6/1992 | Munter | 370/60 |
| 5,301,055 | 4/1994 | Bagchi | 359/139 |
| 5,475,679 | 12/1995 | Munter | 370/395 |
| 5,539,559 | 7/1996 | Cisneros et al. | 359/117 |
| 5,631,908 | 5/1997 | Saxe | 370/235 |
| 5,633,961 | 5/1997 | Kirkby et al. | 385/16 |

FOREIGN PATENT DOCUMENTS 0 413 488  2/1991  European Pat. Off. .

OTHER PUBLICATIONS

Yang, "Fast Path Routing Techniques for Nonblocking Broadcast Networks", 1994 IEEE 13th Annual International Phoenix Conference, Apr. 12–15, 1994, pp. 358–364.

Primary Examiner—Hassan Kizou
Attorney, Agent, or Firm—Lee, Mann, Smith, McWilliams, Sweeney & Ohlson

[57] ABSTRACT

A switching matrix has a plurality of inputs and outputs which may be connected to each other. Pairs of inputs and outputs are examined sequentially to determine whether a connection can be made across the matrix. If the evaluated input and output are busy a connection cannot be made, and the input remains idle. When a connection can be made a connection is scheduled, taking into account the time for which that connection has been available. Inputs and outputs have controllers which continuously monitor, e.g. by using counters, the time for which connections have been available. Idle time at inputs is reduced, thereby increasing switching capacity. The switching matrix may be one which handles ATM traffic.

11 Claims, 5 Drawing Sheets

SCHEDULING CONNECTIONS ACROSS A SWITCHING MATRIX

This invention relates to switching of signals and in particular to the switching of packet telecommunications signals such as Asynchronous Transfer Mode (ATM) cells.

BACKGROUND OF THE INVENTION

With increasing telecommunications traffic, there is interest in developing higher capacity switches capable of switching in the region of 1000 Gbit/sec (1 Terabit/sec).

One form of switch for operating at such high bit rates comprises an optical space switching core having a number of traffic inputs and outputs, each connected to a satellite switch which buffers traffic, in the form of ATM cells, until a path across the switch core is free.

The switch core is managed by a core controller. The core controller periodically receives information about awaiting traffic from the satellite switch buffers, schedules connections across the switch core and informs the satellite switches of these connections, such that cells can be transmitted from the buffers to coincide with the connections set-up across the switch core.

The optical space switching core typically comprises a matrix of sixteen inputs by sixteen outputs, offering 256 possible connections. Evaluating connections across the switch core in the available time at high data rates (e.g. 10 Gbit/sec or more) is a problem. It is desirable to evaluate the entire matrix each cell period to find a best-fit of the awaiting traffic to the matrix capacity. However, this is not conveniently possible in the available time with current technology.

One simpler way of evaluating connections across the matrix, which can be carried out in the limited available time, is to sequentially examine pairs of inputs and outputs of the matrix. If the input and output under examination are both free, a connection is granted between them. If the input or output under examination are busy then a connection cannot be made between that particular pair, and the input remains idle for that period, thereby lowering switching capacity. U.S. patent application Ser. No. 5,301,055 (Bagchi et al.) describes a scheduler for a packet switch which employs this kind of sequential search strategy.

It is an object of the present invention to increase switching capacity and to minimise the time that inputs to the switching matrix remain idle when a sequential evaluation strategy is used.

SUMMARY OF THE INVENTION

According to the present invention there is provided a method of scheduling connections in a switching matrix having a plurality of inputs and outputs which may be connected to each other, the method comprising:

monitoring time for which each possible connection across the matrix is available;

sequentially evaluating the inputs and outputs to determine whether connections can be made across the matrix;

and scheduling connections across the matrix between evaluated inputs and outputs for a particular time, accounting for at least some of the monitored time for which those connections have been available thereby minimising time that an input is idle because a connection has not been made across the matrix.

According to another aspect of the invention there is provided a switching arrangement comprising a switching matrix having a plurality of inputs and outputs which may be connected to each other and a controller for scheduling connections in the matrix, the controller comprising:

a monitoring means for monitoring time for which each possible connection across the matrix is available;

an evaluating means for sequentially evaluating the inputs and outputs to determine whether connections can be made across the matrix; and, a scheduling means for scheduling connections across the matrix between evaluated inputs and outputs for a particular time, accounting for at least some of the monitored time for which those connections have been available thereby minimising time that an input is idle because a connection has not been made across the matrix.

In a preferred embodiment of the invention inputs and outputs of the matrix are arranged in input/output pairs, each pair having a controller, there being signalling buses connecting controllers to convey signalling information relating to the state of respective pairs of inputs and outputs.

By monitoring the time for which connections have been available it is possible to reduce the number and length of idle periods which result when the switching matrix is evaluated sequentially.

The invention may be used in a switch which handles any form of packet signals. Asynchronous Transfer Mode (ATM) cells are a preferred form of packet signal, as used in the following description.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
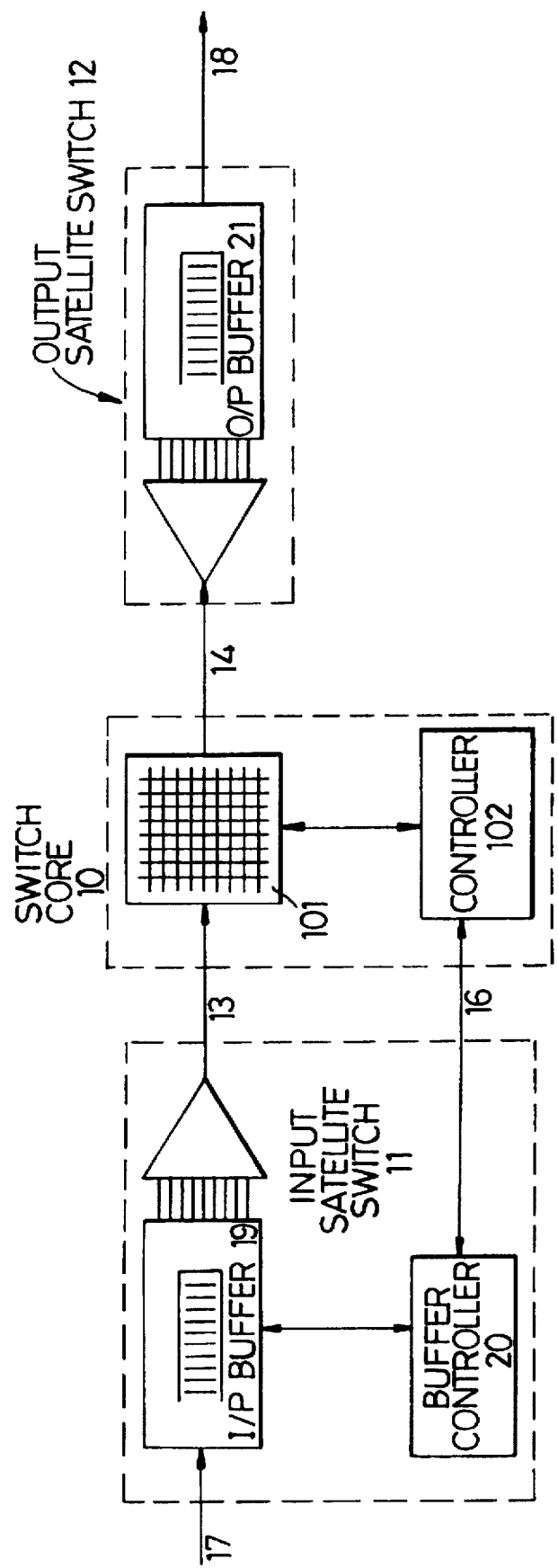
FIG. 1 schematically shows a high-capacity switch.

FIG. 1 schematically shows the architecture of a high-capacity switch. An optical space switching core 101 and a single pair of input 11 and output 12 satellite switches are shown for clarity, although there are many such pairs of satellite switches connected to the core in the same manner as the pair shown. Telecommunications traffic, in the form of ATM cells, flows 17 into an input buffer 19 of satellite switch 11. Input buffer 19 may be based on common memory switching technology, as known in the art. Cells are stored in queues corresponding to outputs for which they are destined. Cell destinations can easily be determined from header bytes of the ATM cells. Core controller 102 periodically receives information on the state of the input buffer queues of satellite 11 from buffer controller 20 over control link 16.

Controller 102 schedules a connection across the switch core at a time shortly into the future to allow time for the round trip delay between issuing a grant signal over link 16 to buffer controller 20, and the subsequent passage of cells released from buffer 19 over link 13 to the switch core. In this manner minimal time is wasted at the switch core.

Cells may again be buffered 21 at output satellite 12 before continuing 18 across the network.

Typically each satellite switch comprises input and output sections of the type shown separately as 11 and 12 in FIG. 1, with traffic being routed from the input section of one satellite switch, through the switch core, to the output section of another satellite switch.

It is possible to provide a controller which manages the entire switch core, but it is preferred to distribute the control function by providing one controller to manage each pair of input and output ports. These individual controllers may be physically located as a single device.

Figure 2:
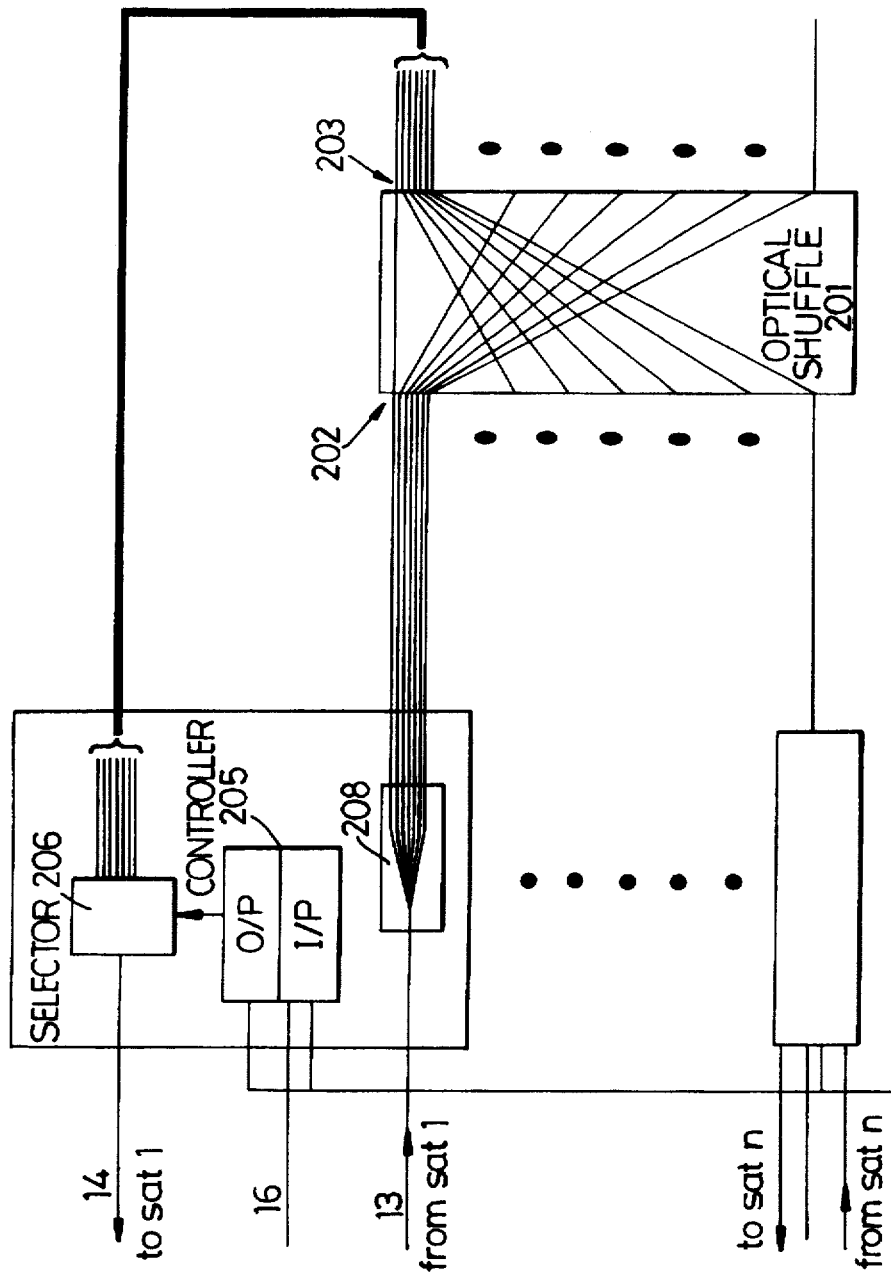
FIG. 2 shows part of the switch of FIG. 1 in more detail.

FIG. 2 shows the switch core 10 of FIG. 1 in more detail, with one input transmitter and output receiver pair of the switch core and a controller 205 for the input/output pair. In a sixteen input by sixteen output matrix there will be sixteen such arrangements. The type of switch shown is a form of crosspoint that is suited to optical technology, commonly called a broadcast crosspoint. Each input transmitter to the matrix broadcasts the same signal to all of the outputs, the outputs receiving a group of these broadcasts and selecting one of them. Data from a satellite arrives 13 at the core via an optical link, is split by splitter 208 and transmitted to input port 202 of optical shuffle 201. The optical shuffle is a mesh of optical waveguides, each input port contributing a portion of the input signal to each output port, such that each input port is linked to each output port. At output port 203 of the optical shuffle sixteen optical signals emerge, one from each input to the shuffle. Selector (a fibre multiplexer) 206 receives these signals and, under the control of controller 205, selects one of them to send 14 to the output satellite. The selector is an opto-electronic device which receives optical signals from the optical shuffle and an electrical selection signal from the controller.

Controller 205 has an input section to handle functions associated with the input transmitter, and an output section to handle functions associated with the output receiver. All controllers are linked by control buses 207 such that each controller is aware of the state of the remainder of the switch core. The input controller receives, via link 16, details of traffic awaiting at the satellite and evaluates connections across the switch core between its single input transmitter and an available output receiver by signalling over buses 207. Instructions of granted connections are sent to the satellite over control link 16. At the output for which the traffic is destined an output controller schedules an instruction to it's fibre multiplexer 206 to select a fibre corresponding to that input. In this manner a connection is set up across the switch core.

Figure 3:
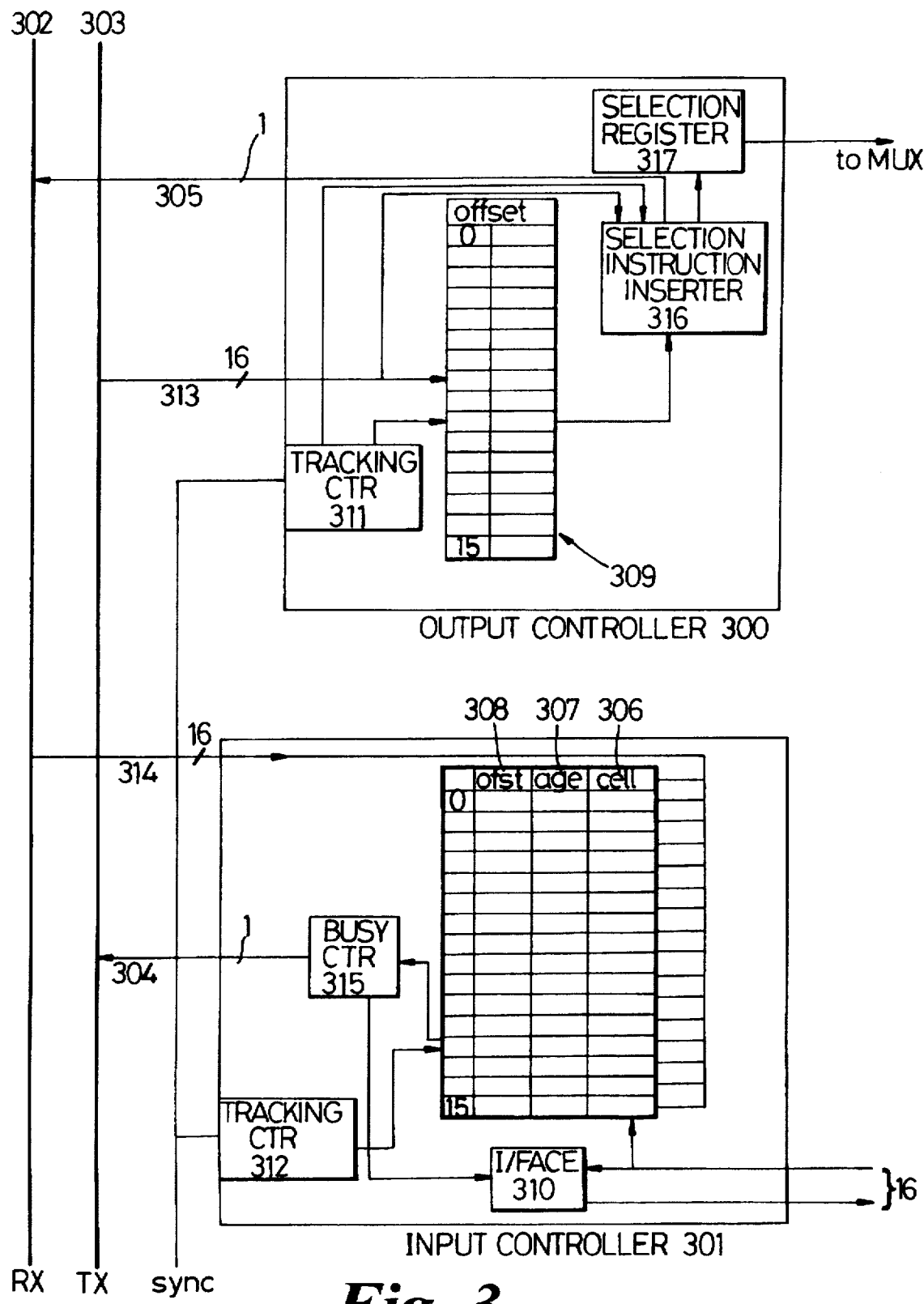
FIG. 3 shows a switching controller.

FIG. 3 schematically shows one of the controllers. Functions associated with the output port of the switch core are shown generally as box 300 and functions associated with the input port of the switch core are shown generally as box 301.

The controllers schedule connections for 64 cell periods ahead of real time, such that they can account for path delays between the switch core and the satellite switches. Block 310 is an interface with control link 16 to the satellite, measuring the round trip delay between the switch core and the satellite switch and storing grant instructions for future transmission to the satellite. Block 317 of output controller 300 is a register which stores future selection instructions for the fibre multiplexer.

Two buses 302, 303, keep the set of controllers informed of the state of the switch core. Transmit (TX) bus 303 indicates which transmitters at the switch core inputs are available or busy, and receive (RX) bus 302 indicates which receivers at the switch core outputs are available or busy. Each bus 302,303 has one bit line for each controller e.g. with sixteen controllers there is a sixteen line bus. Each input controller 301 sends a signal 304 to one line of transmit bus 303 to indicate whether it's transmitter is busy, and monitors every line of the receive bus. Each output controller 300 sends a signal 305 to one line of receive bus 302 to indicate whether it's receiver is busy, and monitors every line of the transmit bus for grant signals. To ensure that controllers are kept informed, signals on the buses must reach all controllers within one ATM cell period. This requires high speed drivers to drive the backplane.

The signalling over the buses will now be explained with reference to FIG. 4 and 5.

Each input controller is responsible for evaluating connections to available output ports. Connections are established on the TX bus by the input controller and recognised by the desired output controller, which then signals that it is busy on the RX bus to prevent other input controllers from establishing connections with it. The signal level of the bus defines the state of the ports: a high level shows a port in use, a low level shows a free port. The length of time held high defines the connection length (number of cells to be sent).

A falling edge signals a connection clearing, a rising edge signals that a connection is being made and also the source of that connection. All controllers are synchronised, and during each clock period each input controller can inspect one output. An output controller can deduce which input controller is requesting a connection at a particular time. A form of cyclic search is used, e.g. input 1 may examine outputs 0,1,2,3,4 ... 15 in order.

Figure 4:
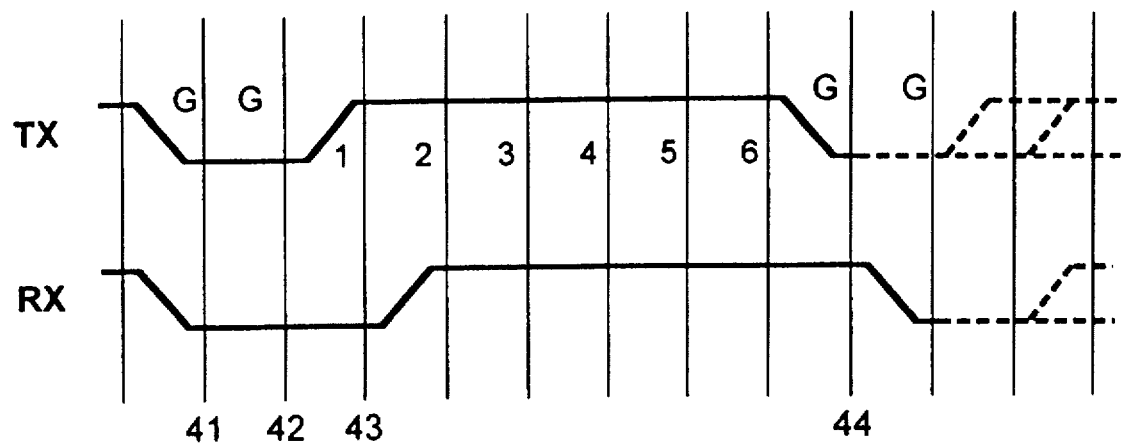
FIG. 4 shows signal waveforms generated by parts of the switch during a standard scheduling process.

FIG. 4 shows the standard connection grant issuing process. The upper line shows TX bus signalling from an input controller requesting a connection, and the lower line the RX bus signalling from an output controller with whom a connection is sought. A connection to allow the passage of six cells across the switch core is shown as an example.

At point 41 the RX bus line is released to indicate that the output is free (this may have happened some time earlier or one clock period later and would still be valid for this example). Independently, an input also becomes free and enters the first of two guard cells. At point 42 the input controller evaluates a connection to the output and finds it to be available.

The input controller schedules a grant by signalling a rising edge on the TX bus. At point 43 the output controller sees the TX bit transition and sets it's RX bit line busy. The one clock delay is due to the time taken by the signal to cross the backplane. From this point until the end of the grant the RX bit line follows the TX bit line. At point 44 the RX bit line is released and from here the two lines operate independently until another connection is made between them.

When a connection is evaluated, there is a chance that the output is busy, because of an ongoing connection across the switch core between that output and another input. Because only one output can be evaluated during each clock period, the input remains idle, reducing throughput.

However, because connections are being scheduled ahead of real time, there is a chance of recovering this idle time and using it to extend the length of following connections which can be made.

Figure 5:
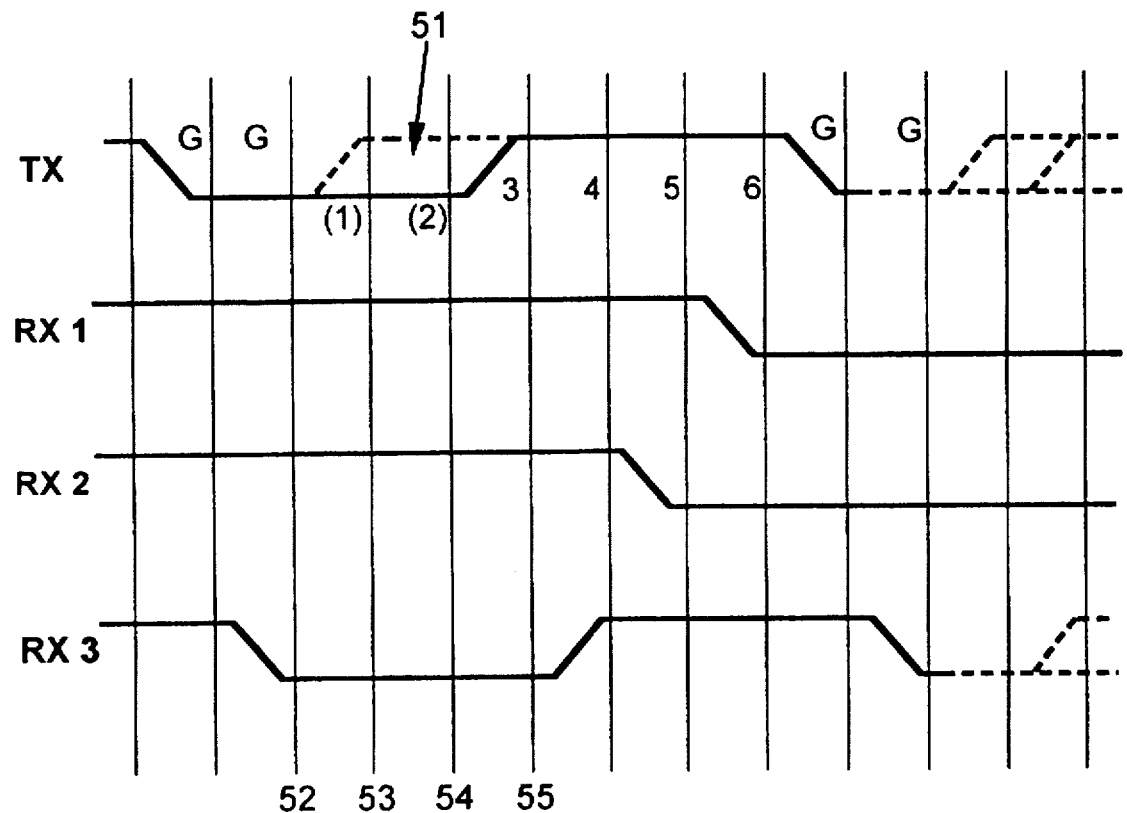
FIG. 5 shows signal waveforms generated by parts of the switch during a scheduling process; and, FIG. 6 shows how connection instructions are issued by the controllers.

FIG. 5 shows the signalling for this improved scheduling process, which recovers idle time. As before, a six cell connection is considered. The input transmitter becomes free, as in FIG. 4, and enters two guard spaces. At points 52 and 53 the input controller evaluates connections with output 1 (RX1) and output 2 (RX2) but finds both to be busy. The input transmitter remains idle for this time. At 54 the input controller evaluates a connection with output 3 (RX3) and finds it to be free. A grant is scheduled in the same manner as before, by signalling a rising edge on the TX bus. However, the input and output controllers are both aware that two clock periods have elapsed since a valid connection could have been made (shown as dashed section 51). A short grant lasting four periods is signalled over the TX and RX buses whilst the input and output ports, aware of the two extra periods available, issue a larger grant pushed forward in time. In this manner idle time is recovered, thereby increasing throughput.

There is one additional situation which controllers must consider. Referring again to FIG. 4, there is a one clock period delay between an input controller signalling on the TX bus, and an output controller signalling that it's receiver is busy on the RX bus. Looking at point 43, the next input seeking a connection with that output examines the RX bus and also sees a free port and could attempt to grant a connection. The input controller must therefore check the TX bus of the controller which precedes it in order of checking. With faster bus signalling there will be a reduced delay between an input controller signalling on the TX bus and an output controller receiving the signal and signalling on the RX bus, and therefore this additional checking will not be required.

Referring back to FIG. 3, this shows the main functional blocks of the controller and those needed to implement the waste recovery method just described. The input and output sections of one controller are shown. There will be sixteen such controllers in a sixteen by sixteen switch core matrix.

Most of the functional blocks are counters or registers. The input controller 301 maintains three records for each of the output ports: 'offset counter' 308, 'age counter' 307 and 'cell register' 306. Cell register 306 stores details of each queue of cells waiting at the satellite switch for connection to each output port of the switch core. Age counter 307 is a timer which begins when a request is received for that particular output. The age counter must time out before a grant can be considered by the controller for that particular destination. This is to prevent wasting bandwidth by granting connections for short groups of cells, each grant separated by guard cells. Rather, the age counter ensures that a queue has built up before a grant is scheduled.

Offset counters 308 are required for the idle recovery process. These count the time, in cell periods, that both ends of a connection have been free. The entire RX bus 302 is connected 314 to the input controller, such that each offset counter 308 continuously maintains a count of how long each output port has been free. With a 16×16 matrix, each output port is evaluated once every sixteen cell periods, and the maximum possible recoverable time is fifteen cell periods, implying a four bit counter block for this function. When a particular output port is evaluated for a possible grant, the offset counter associated with that output is checked to determine how much earlier that particular connection could have been made.

In the output controller 300 a similar monitoring function is carried out for the transmit bus 303, with one offset counter 309 monitoring each line of the transmit bus.

A further counter 311, 312 in each controller allows the controllers to keep track of the input/output that is being evaluated at a particular time, all of the counters in the system being advanced by a synchronising signal.

Busy counter 315 determines how long the TX bus should be held high, with reference to the number of cells to send, given by cell register 306, and the offset time, given by offset counter 308. The busy counter computes [number of cells to send−offset time] and counts down in synchronism with the system clock. As an example, for the situation in FIG. 5, the number of cells to send=6 and the offset time=2 cell periods. The TX bus is therefore held high for four clock periods. Connection instructions to the satellite, via block 310 and link 16, and to the fibre multiplexer, via register 317, are for the full six cell periods.

Block 316 of output controller 300 routes signalling information to the RX bus. This ensures that when an input controller signals a grant to the output controller over the TX bus, the RX bus line for that port is held high to prevent any other input controllers from establishing a connection with it. Block 316 also addresses register 317, inserting selection instructions at an appropriate point in the register dependant on the amount of idle time (if any) that is being recovered.

Figure 6:
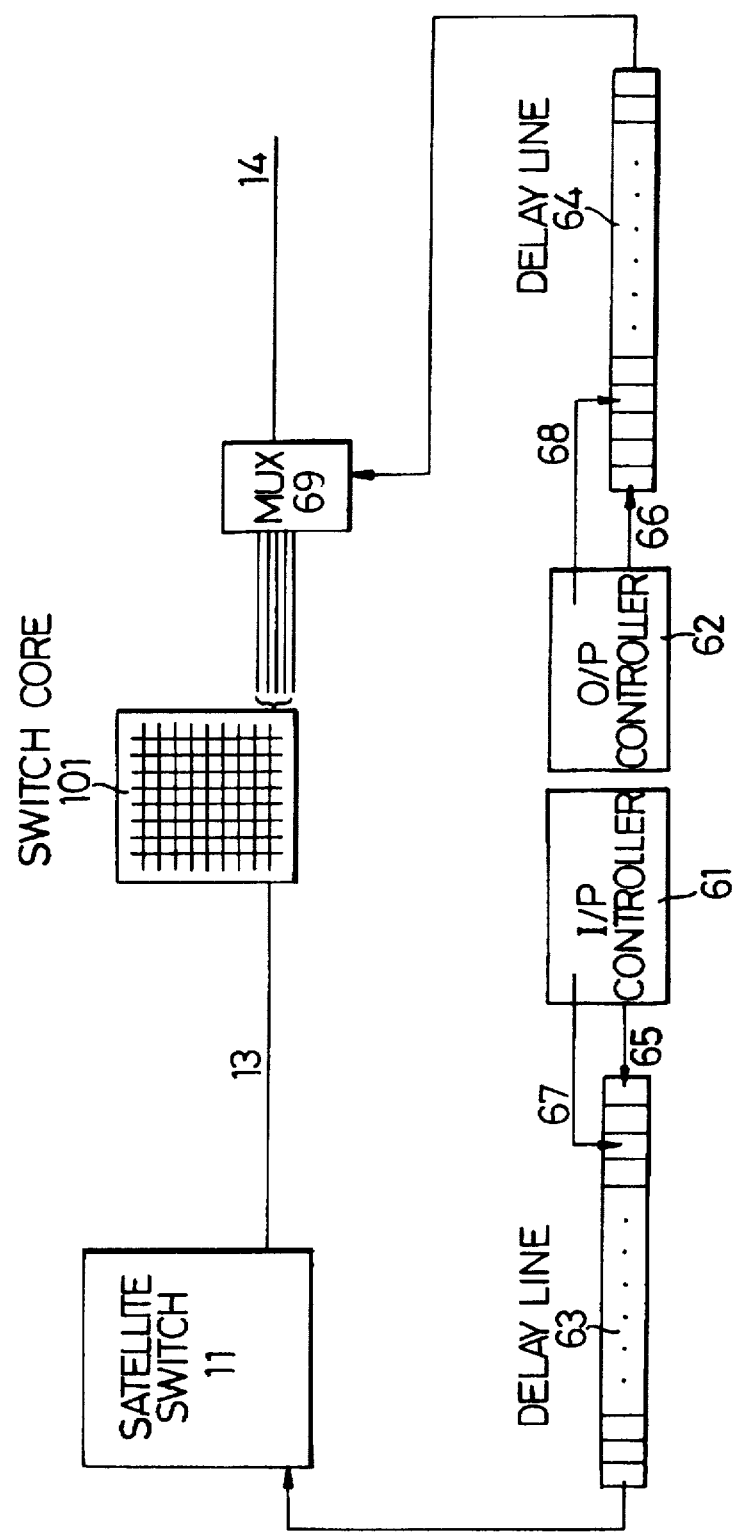

FIG. 6 shows how instructions for future connections are stored. Input controller 61 is coupled to satellite switch 11 via a delay line 63, which stores future grant instructions for transmission to the satellite. A similar delay line 64 couples the output controller 62 to the fibre multiplexer 69 of the switch core 101. These delay lines are typically 64 entry registers which are advanced in synchronism with the system clock. Connection instructions 66 are normally sent from the output controller 62 to the end of the delay line 64. However, if idle time is being recovered connection instructions are inserted 68 further along the delay line at a point corresponding to the offset time indicated by the relevant offset counter. Similarly, at the input controller connection instructions are inserted 67 at a point along the delay line which accounts for the round trip delay to the satellite switch and any idle recovery time, also indicated by the relevant offset counter, so that cells arrive at the switch core at the same time as the connection across the switch core has been set up.

What is claimed is:

1. A method of scheduling connections in a switching matrix having a plurality of inputs and outputs which may be connected to each other, the method comprising:

monitoring time for which each possible connection across the matrix between an input of the matrix and an output of the matrix is available;

sequentially evaluating the inputs and outputs to determine whether connections can be made across the matrix;

and scheduling connections across the matrix between evaluated inputs and outputs for a particular time, accounting for at least some of the monitored time for which those connections have been available thereby minimising time that an input is idle because a connection has not been made across the matrix.

2. A method according to claim 1 wherein the step of scheduling connections across the matrix includes maintaining a time-ordered register of future connection instructions for the matrix, new instructions normally being inserted at the newest end of the register, and wherein if a connection has been available instructions are advanced in time by inserting them at a point along the register corresponding to the monitored time.

3. A switching arrangement comprising a switching matrix having a plurality of inputs and outputs which may be connected to each other and a controller for scheduling connections in the matrix, the controller comprising:

a monitoring means for monitoring time for which each possible connection across the matrix between an input of the matrix and an output of the matrix is available;

an evaluating means for sequentially evaluating the inputs and outputs to determine whether connections can be made across the matrix; and, a scheduling means for scheduling connections across the matrix between evaluated inputs and outputs for a particular time, accounting for at least some of the monitored time for which those connections have been available thereby minimising time that an input is idle because a connection has not been made across the matrix.

4. A switching arrangement according to claim 3 wherein the scheduling means includes a time-ordered register of future connection instructions for the matrix, new instructions normally being inserted at the newest end of the register, and wherein if the monitoring means indicates that a connection has been available instructions are inserted at a point along the register corresponding to the monitored time.

5. A switching arrangement according to claim 3 wherein the monitoring means comprises a set of counters, each counter counting the time for which a connection between a particular input and output has been available.

6. A switching arrangement according to claim 3 wherein inputs and outputs of the matrix are arranged in groups, each group having a group controller and wherein signalling buses connect group controllers to convey signalling information relating to the state of respective groups of inputs and outputs.

7. A switching arrangement according to claim 3 wherein inputs and outputs of the matrix are arranged in input/output pairs, each pair having a controller and wherein signalling buses connect controllers to convey signalling information relating to the state of respective pairs of inputs and outputs.

8. A switching arrangement according to claim 3 wherein the switching matrix comprises an arrangement of electronic, opto-electronic and optical parts configured to act as a space switch.

9. A switching arrangement according to claim 3 for switching packet traffic.

10. A switching arrangement according to claim 9 wherein the packet traffic is Asynchronous Transfer Mode (ATM) traffic.

11. A telecommunications network incorporating a switching arrangement according to claim 3.

* * * * *